United States Patent
Ko

(10) Patent No.: US 12,424,634 B2
(45) Date of Patent: Sep. 23, 2025

(54) CONDUCTIVE MATERIAL DISPERSED SOLUTION, CATHODE SLURRY COMPOSITION AND CATHODE FOR SECONDARY BATTERY

(71) Applicant: SK On Co., Ltd., Seoul (KR)

(72) Inventor: Byoung Ho Ko, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/509,758

(22) Filed: Nov. 15, 2023

(65) Prior Publication Data
US 2024/0178401 A1    May 30, 2024

(30) Foreign Application Priority Data
Nov. 29, 2022    (KR) .......... 10-2022-0162156

(51) Int. Cl.
| | | |
|---|---|---|
| H01M 4/13 | (2010.01) | |
| C09D 5/24 | (2006.01) | |
| C09D 7/40 | (2018.01) | |
| C09D 7/61 | (2018.01) | |
| C09D 133/04 | (2006.01) | |

(Continued)

(52) U.S. Cl.
CPC .............. *H01M 4/625* (2013.01); *C09D 5/24* (2013.01); *C09D 7/61* (2018.01); *C09D 7/70* (2018.01); *C09D 133/04* (2013.01); *H01M 4/13* (2013.01); *C08K 3/041* (2017.05);
(Continued)

(58) Field of Classification Search
CPC .. H01M 4/625; H01M 4/13; H01M 2004/028; H01M 4/131; H01M 4/622; H01M 4/624; H01M 4/628; H01M 4/139; H01M 2004/021; C09D 5/24; C09D 7/61; C09D 7/70; C09D 133/04; C08K 3/041; C08K 2201/001; C08K 2201/011

See application file for complete search history.

(56) References Cited

U.S. PATENT DOCUMENTS

| | | | |
|---|---|---|---|
| 11,456,450 B2 * | 9/2022 | Lim .................. | G01N 11/04 |
| 11,735,714 B2 * | 8/2023 | Lee .................. | H01M 4/664 |
| | | | 429/231.8 |

(Continued)

FOREIGN PATENT DOCUMENTS

| | | |
|---|---|---|
| JP | 202263854 A | 4/2022 |
| KR | 1020220048347 A | 4/2022 |

(Continued)

*Primary Examiner* — Mark Kopec
*Assistant Examiner* — Jaison P Thomas
(74) *Attorney, Agent, or Firm* — The Webb Law Firm

(57) ABSTRACT

A conductive material dispersed solution includes an acrylic dispersant containing an acrylic compound, a conductive material, and a dispersion medium. A solids content of the conductive material dispersed solution is 3% by weight or more, and a shear viscosity value of the conductive material dispersed solution measured at 25° C. and a shear rate of 1/s is 70 Pa·s or less. Provided is a conductive material dispersed solution, in which the conductive material is pre-dispersed to an excellent level through an acrylic dispersant to effectively improve dispersibility of the conductive material when added to the cathode slurry composition, and high solids characteristics of the cathode slurry and the like may be secured by suppressing aggregation between active material particles in the cathode slurry.

7 Claims, 2 Drawing Sheets

(51) Int. Cl.
*H01M 4/62* (2006.01)
*C08K 3/04* (2006.01)
*H01M 4/02* (2006.01)

(52) U.S. Cl.
CPC .. *C08K 2201/001* (2013.01); *C08K 2201/011* (2013.01); *H01M 2004/028* (2013.01)

(56) References Cited

U.S. PATENT DOCUMENTS

| | | | |
|---|---|---|---|
| 2020/0127281 A1* | 4/2020 | Moon | H01M 4/13 |
| 2020/0165469 A1* | 5/2020 | Horikoshi | C09D 7/70 |
| 2020/0259162 A1* | 8/2020 | Lee | H01M 4/139 |
| 2022/0320519 A1* | 10/2022 | Ko | H01M 10/0525 |
| 2024/0178389 A1* | 5/2024 | Ko | H01M 4/622 |

FOREIGN PATENT DOCUMENTS

| | | | | |
|---|---|---|---|---|
| WO | 2022040425 A9 | 2/2022 | | |
| WO | WO-2022080206 A1 * | 4/2022 | | C08F 20/00 |

* cited by examiner

CONDUCTIVE MATERIAL DISPERSED SOLUTION, CATHODE SLURRY COMPOSITION AND CATHODE FOR SECONDARY BATTERY

CROSS-REFERENCE TO RELATED APPLICATION

This application claims priority to Korean Patent Application No. 10-2022-0162156 filed Nov. 29, 2022, the disclosure of which is hereby incorporated by reference in its entirety.

BACKGROUND OF THE INVENTION

Field of the Invention

The technology and implementations disclosed in this patent document generally relate to a conductive material dispersed solution, a cathode slurry composition, and a cathode for a secondary battery.

Description of Related Art

Research into electric vehicles (EVs) that may replace fossil fuel-based vehicles, one of main causes of air pollution, has recently been actively conducted. As a power source for such electric vehicles (EVs), lithium secondary batteries with high discharge voltage and output stability are mainly used, and demand for and interest in a cathode for a secondary battery having excellent performance are also increasing.

In general, the conductive material is added to the cathode slurry in a powder state, and to disperse the conductive material into the cathode slurry, a method of applying a strong kneading treatment with a Planetary Disperser (PD) Mixer or the like in the addition operation is applied, but in this case, when the high-performance conductive material is introduced in a powder state, it is substantially difficult to disperse, and there may be a problem in that the slurry preparation (mixing) process may be prolonged.

In addition, a lithium-transition metal composite oxide (e.g., NCM-based active material) or a lithium iron phosphate-based (LFP) active material containing lithium as a cathode active material for a secondary battery is mainly used, and a cathode slurry obtained by dissolving such a cathode active material in a solvent is coated on a substrate such as a cathode current collector or the like and then dried to prepare a cathode for a secondary battery. In general, when the particle size of the cathode active material is reduced, ionic conductivity may be improved, but the specific surface area is also increased, and thus, aggregation between particles may be intensified. When aggregation between active material particles in the cathode slurry intensifies, dispersion of the active material becomes difficult, limiting the increase in the solids content of the slurry, and flowability and processability may be deteriorated due to increased viscosity of the slurry.

Thus, depending on the characteristics (solids content, viscosity, or the like) of the cathode slurry including the conductive material and the cathode active material, there may be restrictions on cathode loading design, coating speed setting, or the like, and adhesion, resistance characteristics and the like of the finally manufactured cathode for a secondary battery may also be affected. Accordingly, there is a demand for development of a cathode slurry with which a cathode for a secondary battery having improved performance may be produced with excellent processability.

SUMMARY OF THE INVENTION

The disclosed technology can be implemented in some embodiments to provide a conductive material dispersed solution in which dispersibility of a conductive material, a solids content of slurry, and the like may be improved when added to a cathode slurry composition.

The disclosed technology can be implemented in some embodiments to provide a slurry composition in which a cathode for a secondary battery may be prepared without limitations on electrode loading design, coating speed setting, and the like.

The disclosed technology can be implemented in some embodiments to provide a cathode for a secondary battery having improved adhesion between a current collector and a mixture layer and excellent ion conductivity, thereby having a relatively low resistance value.

In some embodiments of the disclosed technology, a conductive material dispersed solution includes an acrylic dispersant containing an acrylic compound, a conductive material, and a dispersion medium. A solids content of the conductive material dispersed solution is 3% by weight or more, and a shear viscosity value of the conductive material dispersed solution measured at 25° C. and a shear rate of 1/s is 70 Pa·s or less.

The acrylic compound may include a polyacrylate-based compound.

A number average molecular weight ($M_n$) of the acrylic compound may be 100,000 or less.

The acrylic dispersant may be included in an amount of 5 to 40 parts by weight with respect to 100 parts by weight of the conductive material, based on the solids content.

The acrylic dispersant may be included in an amount of 0.1 to 10% by weight based on the solids content.

The conductive material may be included in an amount of 0.1 to 20% by weight based on the solids content.

In some embodiments of the disclosed technology, a cathode slurry composition includes the conductive material dispersed solution according to any one of the above-described embodiments, a cathode active material, and a solvent.

In some embodiments of the disclosed technology, a cathode for a secondary battery is prepared by the cathode slurry composition.

The cathode for a secondary battery may have an electrode adhesion value greater than 0.30 N/18 mm.

The cathode for a secondary battery may have an electrode resistance value of less than 30.0 Ω·cm.

BRIEF DESCRIPTION OF THE DRAWINGS

Certain aspects, features, and advantages of the disclosed technology are illustrated by the following detailed description with reference to the accompanying drawings.

DESCRIPTION OF THE INVENTION

Features of the disclosed technology disclosed in this patent document: are described by example embodiments with reference to the accompanying drawings.

Hereinafter, various implementations according to the disclosed technology will be described, but the embodiments may be modified in many different forms, and the scope is not limited to the implementations described below.

In the present specification, 'acrylic compound' refers to a compound such as a monomer, polymer or the like having an acryl group represented by 'H$_2$C=CH—COO—'. Illustratively, the acryl-based compound may be an 'acrylate-based' compound, which is a monomer or polymer having an acrylate group represented by 'H$_2$C=CH—COO—'. At this time, the 'acrylate-based' compound may be a polyacrylate-based compound such as polymethyl methacrylate (PMMA) or the like.

As described above, when the conductive material is added in the form of particles into the cathode slurry, the dispersibility of the conductive material may deteriorate. As the particle size of the cathode active material decreases, ion conduction properties may be improved, but the degree of aggregation between particles also increases, and thus dispersibility in the slurry may decrease. In this case, the viscosity of the slurry may increase and the flowability may decrease, and there may be a limit to increasing the solids content of the slurry, and thus it may be difficult to improve processability, cathode energy density, and the like.

Figure 1A:
FIG. 1A is a view illustrating the form of a cathode slurry composition according to Comparative Example 3.
Figure 1B:
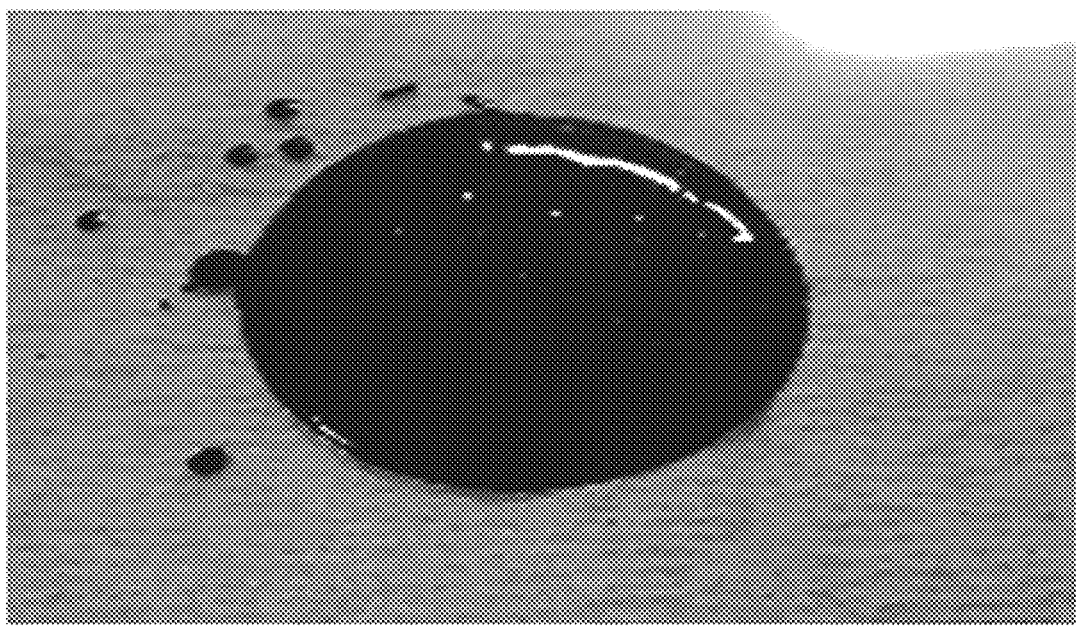
FIG. 1B is a view illustrating the form of a cathode slurry composition according to Example 8.
Figure 1C:
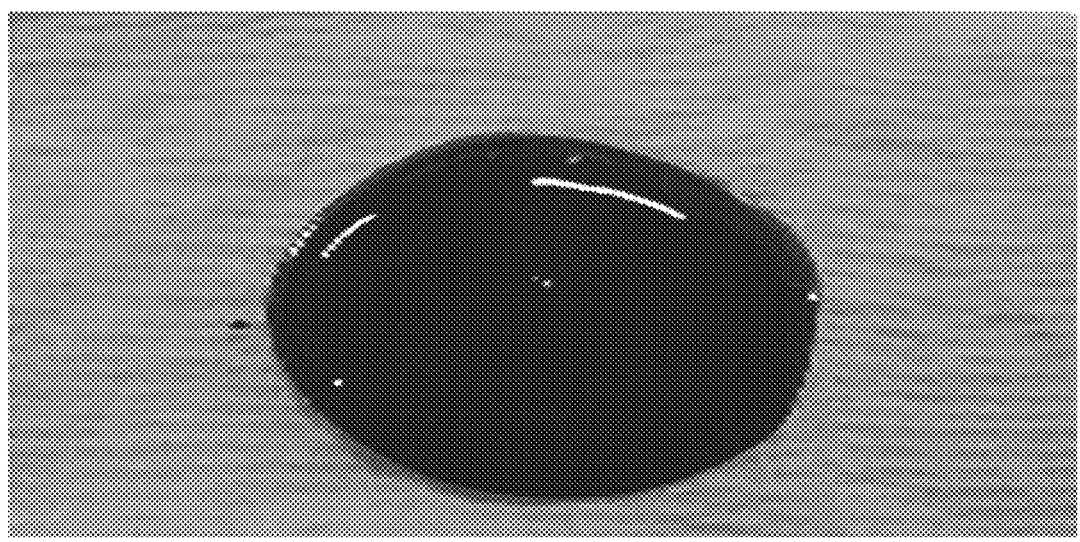
FIG. 1C is a view illustrating the form of a cathode slurry composition according to Example 9.

Accordingly, the inventors have found that when an acrylic dispersant is added to the conductive material dispersed solution and/or the cathode slurry, the degree of dispersion of the cathode active material is effectively improved to suppress aggregation between particles, and a decrease in slurry viscosity and an increase in solids content may be induced. With reference to FIGS. 1A to 1C, implementations thereof will be described in detail below.

FIG. 1A is a view illustrating the form of a cathode slurry composition according to Comparative Example 3.

FIG. 1B is a view illustrating the form of a cathode slurry composition according to Example 8.

FIG. 1C is a view illustrating the form of a cathode slurry composition according to Example 9.

Conductive Material Dispersed Solution

A conductive material dispersed solution according to an embodiment includes an acrylic dispersant containing an acrylic compound, a conductive material and a dispersion medium. The solids content of the conductive material dispersed solution is 3% by weight or more, and the shear viscosity value of the conductive material dispersed solution measured at 25° C. and a shear rate of 1/s is 70 Pa·s or less.

The acrylic dispersant is a dispersant containing an acrylic compound having an acrylic group, and by effectively improving the dispersibility of the conductive material and the cathode active material (in detail, the cathode active material having a relatively small particle size) in the slurry, aggregation between cathode active material particles in the cathode slurry including the acrylic dispersant may be effectively suppressed. Accordingly, coating drying processability and productivity may be improved by improving the viscosity and flowability of the cathode slurry and increasing the solids content to suppress problems such as cracks during slurry drying. In addition, since the solids content of the cathode slurry may be increased, a high-loading electrode may be designed and a cathode with improved energy density may be manufactured.

The acrylic dispersant may be in the form of a dispersion solution in which an acrylic compound is dissolved in a separate solvent, and the acrylic compound included in the acrylic dispersant may be a polyacrylate-based compound. For example, the acrylic dispersant may include a polyacrylate-based compound. The polyacrylate-based compound may be, for example, an acrylic polymer such as polymethyl methacrylate (PMMA), polybutyl acrylate (PBA) or the like, and is not particularly limited as long as it is a compound having an acrylate group represented by 'H$_2$C=CH—COO—'.

The acrylic compound may have a number average molecular weight ($M_n$) of 100,000 or less. Illustratively, the number average molecular weight ($M_n$) of the acrylic compound may be 50,000 or less or 20,000 or less. In addition, the lower limit of the number average molecular weight ($M_n$) of the acrylic compound is not particularly limited, but may be, for example, 1,000 or more, 5,000 or more, or 10,000 or more. When the molecular weight of the acrylic compound is within the above range, by adjusting the viscosity of the dispersant including the same within an appropriate range, the dispersibility may be excellently improved without impairing the properties of other components in the cathode slurry composition.

The conductive material imparts conductivity to the electrode and is used for maintaining the structure of the electrode, and may have conductivity without causing side reactions with other elements of the secondary battery. The conductive material may include graphite such as natural graphite and artificial graphite; carbon-based materials such as carbon black, acetylene black, ketjen black, channel black, furnace black, lamp black, thermal black, carbon fiber, carbon nanotube (CNT), and graphene; metal powders or metal fibers such as copper, nickel, aluminum, and silver; conductive whiskeys such as zinc oxide and potassium titanate; conductive metal oxides such as titanium oxide; or conductive polymers such as polyphenylene derivatives, etc., alone or in a combination of two or more thereof.

The conductive material dispersed solution may be added to the cathode slurry composition in the form of a separate solution in which the conductive material is pre-dispersed in a dispersion medium. As described above, the conductive material is generally added to the cathode slurry in a powder state, and to disperse the conductive material into the cathode slurry, a method of applying strong kneading treatment with a Planetary Disperser Mixer (PD mixer) in the addition stage is applied. However, in this case, when the high-performance conductive material is introduced in a powder state, it is substantially difficult to disperse, and there is a problem that the slurry manufacturing (mixing) process becomes long.

In this regard, when the cathode slurry composition includes a conductive material in the form of the above-described conductive material dispersed solution, since the dispersibility of the conductive material may be further improved, the solids content of the cathode slurry including the same and the manufacturing processability of the cathode slurry and the like may be further improved. Also, adhesion, resistance characteristics, and the like of the finally manufactured cathode may be improved.

The solids content of the conductive material dispersed solution is 3% by weight or more, in detail, may be 5% by weight or more, 6% by weight or more, 10% by weight or more, and may be 50% by weight or less, 40% by weight or less, or 30% by weight or less.

The shear viscosity value of the conductive material dispersed solution measured at 25° C. and a shear rate of 1/s is 70 Pa·s or less, in detail, may be 60 Pa·s or less, 50 Pa·s or less, 20 Pa·s or less, 10 Pa·s or less, or 3 Pa·s or less, and may be 0.01 Pa·s or more or 0.5 Pa·s or more. In addition, the shear viscosity value of the conductive material dispersed solution measured at 25° C. and a shear rate of 10/s is 10 Pa·s or less, and in detail, the shear viscosity value of the conductive material dispersed solution at a shear rate of 10/s may be 9 Pa·s or less, 5 Pa·s or less, 3 Pa·s or less, or 1 Pa·s or less, and may be 0.01 Pa·s or more or 0.1 Pa·s or more.

When the solids content and shear viscosity value of the conductive material dispersed solution are respectively within the above-described ranges, and when the conductive material dispersed solution is added to the cathode slurry, high solids characteristics, viscosity characteristics, flowability, and the like of the slurry may be secured to an improved level.

The conductive material dispersed solution may include 5 to 40 parts by weight of the acrylic dispersant based on 100 parts by weight of the conductive material, based on the solids content. In detail, the conductive material dispersed solution may include 10 parts by weight or more or 20 parts by weight or more and may include 30 parts by weight or less of the acrylic dispersant based on 100 parts by weight of the conductive material, based on the solids content.

The conductive material dispersed solution may include 0.1 to 10% by weight of the acrylic dispersant based on the solids content. In detail, the conductive material dispersed solution may include 1% by weight or more or 2% by weight or more of the acrylic dispersant based on the solids content, and may include 7% by weight or less or 4% by weight or less.

The conductive material dispersed solution may include 0.1 to 20% by weight of the conductive material based on the solids content. In detail, the conductive material dispersed solution may include 1% by weight or more or 5% by weight or more, and 15% by weight or less of the conductive material, based on the solids content.

When the conductive material dispersed solution is added to the cathode slurry composition, the content of the conductive material included in the cathode slurry composition may be 0.01 to 10% by weight based on the solids content. In detail, the content of the conductive material included in the cathode slurry composition may be 0.1% by weight or more or 0.3% by weight or more, and 5% by weight or less or 3% by weight or less, based on the solids content.

In addition, when the conductive material dispersed solution is added to the cathode slurry composition, the content of the acrylic dispersant included in the cathode slurry composition may be 0.01 to 5% by weight based on the solids content. In detail, the content of the acrylic dispersant included in the cathode slurry composition may be 0.05% by weight or more or 0.1% by weight or more, and may be 3% by weight or less or 1% by weight or less based on the solids content.

When (1) the contents of the conductive material and the acrylic dispersant contained in the conductive material dispersed solution, (2) the contents of the conductive material and the acrylic dispersant contained in the cathode slurry composition, etc. are adjusted within the above ranges, respectively, the solids content of the slurry may be increased by improving the dispersibility of the conductive material in the cathode slurry, and the cathode slurry manufacturing processability and the performance of the final manufactured cathode may be further improved.

The type of dispersion medium included in the conductive material dispersed solution is not particularly limited, and may include one or more organic solvents. Illustratively, the dispersion medium may include one or more of dimethyl sulfoxide (DMSO), isopropyl alcohol, N-methyl-2-pyrrolidone (NMP), acetone, and the like.

Cathode Slurry Composition

A cathode slurry composition according to an embodiment includes a conductive material dispersed solution according to any one of the above embodiments, a cathode active material and a solvent. The cathode slurry composition includes a conductive material dispersed solution containing an acrylic dispersant, and has excellent dispersibility of components such as a conductive material, a cathode active material and the like, and may have excellent flowability, viscosity characteristics, high solids content characteristics, and the like.

The cathode slurry composition may include an additional acrylic dispersant. The additional acrylic dispersant may be a separate acrylic dispersant different from the acrylic dispersant included in the above-described conductive material dispersed solution. When the cathode slurry composition includes an additional acrylic dispersant, dispersibility of components such as the cathode active material and the conductive material may be further improved together with the acrylic dispersant included in the above-described conductive material dispersed solution. A detailed description of the additional acrylic dispersant and solvent overlaps with the above description of the acrylic dispersant and solvent, respectively, and thus the description is omitted.

The cathode slurry composition may include 0.1 to 10% by weight of the acrylic dispersant based on the solids content. At this time, the content of the acrylic dispersant in the cathode slurry composition is based on the sum of the content of the acrylic dispersant included in the conductive material dispersed solution and the content of the additional acrylic dispersant separately added to the slurry. In detail, the acrylic dispersant may include 0.5% by weight or more, 1% by weight or more, or 1.5% by weight or more based on the solids content, and may include 7% by weight or less, 5% by weight or less, 3% by weight or less, or 2% by weight or less. If the content of the acrylic dispersant in the cathode slurry composition is too small, there is a substantial limit in obtaining the effect of improving dispersibility and the like through the addition of the acrylic dispersant. If the content of the acrylic dispersant is too large, the electrode resistance value may rather increase, and the content of the cathode active material is relatively low, and thus, it may be difficult to secure high energy density. Therefore, when the content of the acrylic dispersant in the cathode slurry composition is adjusted within the above-described range, slurry dispersibility and the like may improved while securing excellent resistance be effectively characteristics, energy density and the like.

The solids content of the cathode slurry composition may be 65% by weight or more, and may be 99% by weight or less, 90% by weight or less, or 80% by weight or less.

A shear viscosity value of the cathode slurry composition is 900 Pa·s or less measured at 25° C. and a shear rate of 0.1/s, and in detail, may be 700 Pa·s or less, 500 Pa·s or less, 300 Pa·s or less, or 100 Pa·s or less, and may be 0.1 Pa·s or more or 10 Pa·s or more. In addition, a shear viscosity value of the cathode slurry composition is 150 Pa·s or less measured at 25° C. and a shear rate of 1/s, and in detail, may be 140 Pa·s or less, 100 Pa·s or less, 50 Pa·s or less, 30 Pa·s or less, or 10 Pa·s or less, and may be 0.1 Pa·s or more or 1 Pa·s or more. In addition, a shear viscosity value of the cathode slurry composition is 30 Pa·s or less measured at 25° C. and a shear rate of 4.64/s, and in detail, may be 20 Pa·s or less or 10 Pa·s or less, and may be 0.1 Pa·s or more or 1 Pa·s or more. In addition, a shear viscosity value of the cathode slurry composition is 3.5 Pa·s or less measured at 25° C. and a shear rate of 100/s, and in detail, may be 3 Pa·s or less or 2 Pa·s or less, and may be 0.1 Pa·s or more or 1 Pa·s or more.

When the solids content value and the shear viscosity value of the cathode slurry composition are within the above-described ranges, respectively, the flowability of the slurry is relatively excellent, and thus the coating/drying processability and productivity may be effectively improved, the occurrence of cracks in the cathode mixture layer may be reduced, and a high-density loaded cathode may be designed, thereby providing a cathode for a secondary battery with improved energy density.

The cathode slurry composition may have an $R_{PA}$ value of 1.2 or less according to Equation 1 below.

$$R_{PA}=|(PA_0-PA_1)|/PA_0 \quad \text{[Equation 1]}$$

In Equation 1, $R_{PA}$ is the phase angle change rate before and after shearing of the slurry, $PA_0$ is the phase angle (°) of the slurry before shearing, and $PA_1$ is the phase angle (°) of the slurry after shearing.

In detail, the $R_{PA}$ value may be 1 or less, 0.5 or less, 0.4 or less, or 0.2 or less, and may be 0.02 or more or 0.1 or more. At this time, the shear condition may be a condition of applying shear for a time of 300 seconds at a shear rate of 500/s.

The phase angle (PA) is a parameter that may evaluate the viscoelastic properties of the electrode slurry, and may be calculated according to the following equation 2.

$$\delta=\tan^{-1}(G''/G') \quad \text{[Equation 2]}$$

In Equation 2, $\delta$ is the phase angle (°), G' is the storage modulus value measured at a temperature of 25° C., and G" is the loss modulus value measured at a temperature of 25° C.

The storage modulus value (G'), loss modulus value (G"), phase angle, and the like may be measured and calculated by a Plate & Plate (PP) rheometer measurement method. In detail, after putting a certain amount of slurry on the lower plate and adjusting the upper paste spindle to a 0.5 mm gap, the rheology may be measured at a constant temperature of 25° C. At this time, shear was applied for 300 seconds at a shear rate of 500/s to conduct an oscillation test before/after shear, and as a result, the phase angle, G* (complex modulus) and the like may be measured and checked.

The storage modulus value (G') is a value representing the degree of elasticity of an object, and indicates the properties of an elastic body in which, as the value increases, the degree of deformation against external force is relatively small, and the property (restorative force) of storing the same is large. On the other hand, the loss modulus value (G") is a value representing the degree of liquidity of an object, and indicates characteristics similar to those of a liquid with a high degree of deformation against external forces and a small degree of loss (restoration force) as the value increases. Therefore, as the value of G" relative to the value of G' is relatively large (i.e., as the phase angle ($\delta$) is relatively large), the object may exhibit characteristics closer to characteristics of a liquid than a solid.

Typically, the slurry coating process proceeds by coating the cathode slurry stored in the storage tank under agitation on the current collector, and depending on the storage time of the slurry, the viscoelastic properties change, and thus the degree of shear applied to the slurry during the coating process may be changed. At this time, as the degree of change in the viscoelastic properties (phase angle) of the slurry before and after shear increases, it may be necessary to continuously adjust the fine coating conditions, and in this case, processability, productivity, and the like may be greatly reduced. Therefore, when the $R_{PA}$ value is within the above range, the loading uniformity may be improved in the coating process, and defects such as occurrence of a coating gap may be reduced by reducing the degree of non-uniformity between the coated portion and the uncoated portion. Thus, cathode manufacturing processability, productivity and the like using the cathode slurry composition may be excellent.

The phase angle ($PA_0$) before shearing of the cathode slurry composition may be 5° or more, 10° or more, 15° or more, 20° or more, or 30° or more, and may be 60° or less. In addition, the phase angle ($PA_1$) after shearing of the cathode slurry composition may be 10° or more, 15° or more, 20° or more, 25° or more, or 30° or more, and may be 70° or less. At this time, as the shear condition, a shear rate of 500/s and a time of 300 sec may be applied. When shear is applied to the slurry, the structure thereof is deformed and the viscoelastic properties of the slurry may change. When the phase angle ($PA_1$) of the slurry after shearing is within the above range, during the coating process in which shear is applied to the slurry according to a predetermined shear rate, the coating process may proceed smoothly due to the excellent flowability of the slurry.

The cathode active material may have an average particle diameter (D50) of less than 5 μm. In detail, the cathode active material may have an average particle diameter (D50) of 3 μm or less or 1.5 μm or less, and may be 0.1 μm or more or 0.5 μm or more. In addition, the cathode active material may have a specific surface area (BET) of 3 m²/g or more. In detail, a specific surface area (BET) of the cathode active material may be 5 m²/g or more or 9.5 m²/g or more, and may be 50 m²/g or less, 30 m²/g or less, or 13.5 m²/g or less.

The average particle diameter (D50) refers to the average particle diameter on the basis of 50% of the particle diameter distribution, and may be measured and calculated by a general particle size measuring device (e.g., Microtrac MT 3000) and method. In addition, the specific surface area (BET) may be measured and calculated by a general specific surface area measuring device of a gas adsorption method, or the like.

As described above, in general, as the particle size of the cathode active material decreases, ion conduction characteristics may be improved, but as the specific surface area increases, the aggregation between particles intensifies, which may limit the improvement of the solids content of the slurry. A cathode slurry composition according to an embodiment may include an acrylic dispersant and the like to improve dispersibility of a cathode active material having a fine particle size and a large specific surface area in the slurry, and accordingly, the ion conduction characteristics of the active material, the high solids content characteristics of the slurry, and the like may be simultaneously improved.

Therefore, when an acrylic dispersant or the like is included in the slurry composition containing the cathode active material having an average particle diameter (D50) adjusted within the above range, slurry flowability, active material manufacturing processability, and the like may be improved while securing the ion conduction characteristics of the cathode active material to an excellent level.

The type of cathode active material included in the cathode slurry composition is not particularly limited. Illustratively, the cathode active material may include at least one of an LCO-based cathode active material represented by the formula of $LiCoO_2$; an NCM-based cathode active material represented by the formula of $Li_xNi_aCo_bMn_cO_y$ ($0<x\leq1.1$, $2\leq y\leq2.02$, $0<a<1$, $0<b<1$, $0<c<1$, $0<a+b+c\leq1$); an LTO-based cathode active material represented by the formula of $Li_{14}Ti_{15}O_{12}$; or a lithium iron phosphate (LFP)-based active material represented by the formula of $LifePO_4$.

On the other hand, in the cathode slurry composition according to an embodiment, the cathode active material may include a lithium iron phosphate (LFP)-based active material. When the cathode slurry composition includes a lithium iron phosphate (LFP) active material as a cathode active material, the advantages of the lithium iron phosphate (LFP) active material may be maximized while the disadvantages may be effectively alleviated. The lithium iron phosphate-based (LFP) active material is a structurally significantly stable cathode active material, and generally has higher stability than a nickel-chromium-manganese composite oxide (NCM)-based active material, but has the disadvantage of relatively low ionic conductivity. In this regard, when a lithium iron phosphate-based (LFP) active material is applied as a cathode active material, the ion conduction characteristics improved by reducing the particle size. However, in this case, as described above, aggregation between particles in the slurry may easily occur. Therefore, when a lithium iron phosphate (LFP) active material is applied as a cathode active material, it is practically difficult to secure both and stability ion conduction characteristics, as well as processability according to the viscosity and solids content characteristics of the slurry.

Therefore, when an acrylic dispersant or the like is included in the cathode slurry composition containing a lithium iron phosphate-based (LFP) active material, slurry flowability, active material manufacturing processability, and the like may be effectively improved while securing both the structural stability and ion conduction characteristics of the LFP-based cathode active material to an excellent level.

The cathode slurry composition may further include a binder. The binder is a compound added to improve adhesion between particles of the cathode active material and adhesion between the cathode active material and the current collector, and the type thereof is not particularly limited, and thus, general binders used in manufacturing a cathode for a secondary battery may be applied. Illustratively, the binder may be a compound of one or more or a copolymer thereof, selected from the group consisting of polyvinylidene fluoride (PVDF), polyvinylidene fluoride-hexafluoropropylene copolymer (PVDF-co-HFP), polyvinyl alcohol (PVA), polyacrylonitrile (PAN), carboxymethylcellulose (CMC), starch, hydroxypropylcellulose, polyvinylpyrrolidone, tetrafluoroethylene, polyethylene, polypropylene, ethylene-propylene-diene polymer (EPDM), sulfonated-EPDM, styrene butadiene rubber (SBR) and fluorine rubber. When the cathode slurry composition further includes a binder, the binder may be included in an amount of 0.1 to 10% by weight based on the solids content. In detail, the binder may be included in an amount of 0.5% by weight or more or 1% by weight or more based on the solids content, and may be included in 5% by weight or less or 3% by weight or less.

A method of preparing the cathode slurry composition is not particularly limited. Illustratively, the cathode slurry composition may be prepared by mixing the cathode active material, the acrylic dispersant, the solvent, and the like with a Thinky Mixer or the like. At this time, the temperature condition of the mixing process may be 20 to 60° C., the mixing (stirring) speed may be 500 to 1500 RPM, and the mixing time may be 10 to 30 min.

Cathode for Secondary Battery

A cathode for a secondary battery according to an embodiment is made of the cathode slurry composition according to any one of the above-described embodiments. The cathode for the secondary battery includes a cathode current collector; and a cathode mixture layer formed on at least one surface of the cathode current collector. A method of manufacturing a cathode for a secondary battery using the cathode slurry composition is not particularly limited, and a related art manufacturing method may be applied. Illustratively, a cathode for a secondary battery may be manufactured, using a method of applying the cathode slurry composition on a cathode current collector and drying and rolling the cathode slurry composition to form a cathode mixture layer.

The cathode current collector is not particularly limited as long as it has conductivity without causing chemical change in the secondary battery, and illustratively, stainless steel, aluminum, nickel, titanium, fired carbon or aluminum, or stainless steel surface treated with carbon, nickel, titanium, silver, or the like may be applied.

The cathode for a secondary battery may have an electrode adhesive strength value of greater than 0.30 N/18 mm. In detail, the cathode for a secondary battery may have an electrode adhesive strength value of greater than 0.31 N/18 mm, greater than 0.36 N/18 mm, 0.38 N/18 mm or more, or 0.4 N/18 mm or more, and may be 5 N/18 mm or less or 1 N/18 mm or less. The electrode adhesive strength value may be measured by performing a 90-degree peel test using a peel tester to measure the adhesive strength between the cathode current collector and the cathode mixture layer.

The cathode for a secondary battery may have an electrode resistance value of less than 30.0 Ω·cm. In detail, in the cathode for a secondary battery, the electrode resistance value may be less than 27.8 Ω·cm, less than 11.2 Ω·cm, less than 7.8 Ω·cm, 6.4 Ω·cm or less, 5.2 Ω·cm or less, or 4.5 Ω·cm or less, and may be 0.1 Ω·cm or more or 1 Ω·cm or more. The electrode resistance value may be measured by contacting the cathode with the 4-Point-Probe of the electrode resistance meter.

Lithium Secondary Battery

A lithium secondary battery according to an embodiment may include a cathode for a secondary battery formed of the cathode slurry composition according to any one of the above-described embodiments. For example, the lithium secondary battery may include the cathode for a secondary battery according to any one of the above embodiments. Illustratively, the lithium secondary battery may include a cathode for a secondary battery according to any one of the above embodiments; an anode for a secondary battery; a separator interposed between the cathode and the anode; and an electrolyte.

The composition and structure of the cathode are not particularly limited, and an anode for a secondary battery of the related art may be applied. Illustratively, the anode may include an anode current collector; and an anode mixture layer formed on at least one surface of the anode current collector. The anode mixture layer may include one or more types of a carbon-based active material such as artificial graphite, natural graphite and the like, and a silicon-based active material such as Si, $SiOx$ ($0<x<2$), a Si—C composite and the like, as an anode active material.

The material, structure, and the like of the separator is not particularly limited, and a separator for a secondary battery of the related art may be applied. Illustratively, as the separator, a porous polymer film made of a polyolefin-based polymer such as ethylene homopolymer, propylene homopolymer, ethylene/butene copolymer, ethylene/hexene copolymer, ethylene/methacrylate copolymer, and the like; related art porous nonwoven fabric composed of high-melting glass fibers, polyethylene terephthalate fibers, and the like; a coated separator containing ceramic components, a polymer material or the like; and the like may be applied in a single layer or multi-layer structure.

The composition of the electrolyte is not particularly limited, and a secondary battery electrolyte of the related art may be applied. Illustratively, the electrolyte may include at least one of an organic liquid electrolyte, an inorganic liquid electrolyte, a solid polymer electrolyte, a gel polymer electrolyte, a solid inorganic electrolyte, and a molten inorganic electrolyte.

EXAMPLE

1. Slurry and Cathode Preparation

1) Conductive Material Dispersed Solution

The conductive material dispersed solutions of Examples 1 to 7 including the acrylic dispersant, the conductive material (carbon black), and the remainder of the solvent (N-methyl-2-pyrrolidone; NMP) were prepared. At this time, the acrylic dispersant was added in the form of a dispersed solution containing 30% by weight of a polyacrylate-based compound by dissolving a polyacrylate-based compound having a number average molecular weight ($M_n$) of 10,000 to 20,000 in N-methyl-2-pyrrolidone (NMP).

In addition, by including 0.5% by weight of carbon black, 0.1% by weight of hydrogenated nitrile butadiene rubber (H-NBR) and the remainder of the solvent (N-methyl-2-pyrrolidone; NMP), a conductive material dispersed solution of Comparative Example 1 in which the weight ratio of carbon black: hydrogenated nitrile butadiene rubber (H-NBR) is 100:5 was prepared, and a conductive material dispersed solution of Comparative Example 2 without adding a dispersant was prepared. In addition, the conductive material dispersed solutions of Comparative Example 3 and Examples 8 to 9 were prepared by applying carbon nanotubes (CNT) as a conductive material instead of carbon black.

At this time, the dispersant content of the conductive material dispersed solution, the conductive material: dispersant content ratio, and the like are illustrated in Tables 1 and 3 below, the content of the dispersant is based on the content of H-NBR or acrylic polymer, which is a solid component included in the dispersed solution, and the content of the conductive material is based on the content of carbon black or carbon nanotube (CNT), which is a solid component included in the conductive material dispersed solution.

2) Cathode Slurry

Cathode slurries of Comparative Examples 1 to 2 and Examples 1 to 7 were prepared by adding the conductive material dispersed solution prepared as described above to slurry containing NCM-based cathode active material (NE-K12S by L&F Co.), PVDF-based binder (KF 9700 by KUREHA), and a solvent (N-methyl-2-pyrrolidone; NMP).

In addition, cathode slurries of Comparative Example 3 and Examples 8 to 9 were prepared by adding the carbon nanotube (CNT) conductive material dispersed solution prepared as described above to a slurry containing an LFP-based cathode active material (P198-S20 by BTR), a PVDF-based binder (KF 9700 by KUREHA), and a solvent (N-methyl-2-pyrrolidone; NMP).

At this time, shear viscosity, phase angle values before/after shear, and the like according to the slurry composition, solids content, and shear rate of Examples and Comparative Examples are as illustrated in Tables 2 and 3 below, the content of the dispersant is based on the content of H-NBR or acrylic polymer, which is a solid component included in the dispersed solution, and the content of the conductive material is based on the content of carbon black or carbon nanotube (CNT), which is a solid component included in the conductive material dispersed solution.

3) Cathode

The cathode slurry compositions of Examples and Comparative Examples prepared as described above were applied onto a cathode current collector (Al-Foil) with a thickness of 12 μm, at a loading weight (LW) of 23.6 mg/cm², and then were dried at 130° C., and rolled to a thickness of 195 μm, thereby preparing a cathode (loading weight (LW) after rolling: 23.1 mg/cm², electrode density: 2.525 g/cc) for a secondary battery, containing a cathode current collector and a cathode mixture layer formed on one surface of the cathode current collector.

2. Conductive Material Dispersed Solution, Slurry and Cathode Evaluation

Evaluation of Conductive Material Dispersed Solution and Cathode

The conductive material dispersed solution and slurry composition, solids content, shear viscosity according to the shear rate and phase angles before/after shear in the examples and comparative examples prepared as described above are as illustrated in Tables 1 to 3 below. In this case, the shear viscosity was respectively measured according to the shear rate as illustrated in Tables 1 and 3 at a temperature of 25° C., and the phase angle was measured and calculated by a Plate & Plate (PP) rheometer measurement method under the condition of applying shear for 300 seconds at a shear rate of 500/s. In detail, a predetermined amount of slurry was placed on the lower plate, the upper paste spindle was adjusted to 0.5 mm gap, and then the rheology was measured at a constant temperature of 25° C. Oscillation test before/after shear was performed by applying shear for 300 seconds at a shear rate of 500/s, and with the result thereof, the phase angle was measured and confirmed.

2) Cathode (1) Electrode Adhesion

The cathode for a secondary battery prepared as described above was subjected to a 90-degree peel test by a peel tester to measure the adhesive force between the cathode current collector and the cathode mixture layer, and the results are illustrated in Tables 2 and 3 below. In detail, after cutting the cathode into a size of 18 mm in length and 150 mm in width, a tape having a width of 18 mm was attached to the cathode current collector, and a roller with a load of 2 kg was used to ensure sufficient adhesion. Then, after attaching the cathode mixture layer to one side of the tensile tester (DS2-50N by IMADA) using double-sided tape, the adhesive force was measured by fastening the tape attached to the cathode current collector to the other side of the tensile tester.

(2) Electrode Resistance Characteristics

The cathode resistance value was measured by contacting the cathode for a secondary battery prepared as described above with a 4-Point-Probe of an electrode resistance meter (Hioki Co.), and the results are illustrated in Tables 2 and 3 below.

TABLE 1

| Division | | Comparative Example 1 | Comparative Example 2 | Example 1 | Example 2 | Example 3 | Example 4 | Example 5 | Example 6 | Example 7 |
|---|---|---|---|---|---|---|---|---|---|---|
| Conductive material content (weight %) (Carbon black predispersed solution) | | 10 | 10 | 10 | 10 | 10 | 10 | 10 | 10 | 10 |
| Dispersant Type | | H-NBR | — | Acrylic | Acrylic | Acrylic | Acrylic | Acrylic | Acrylic | Acrylic |
| Dispersant Content (weight %) | | 0.5 | — | 0.5 | 1 | 1.5 | 2 | 2.5 | 3 | 3 |
| Conductive material:dispersant content ratio | | 100:5 | — | 100:5 | 100:10 | 100:15 | 100:20 | 100:25 | 100:30 | 100:30 |
| Solids content (weight %) | | 16 | 16 | 16 | 16 | 16 | 16 | 16 | 16 | 25 |
| Shear viscosity (Pa · s) | 1/s | 73.23 | 95.3 | 54.26 | 12.35 | 2.12 | 1.99 | 2.52 | 0.94 | 24.04 |
| | 10/s | 11.34 | 13.73 | 9.17 | 3.65 | 0.53 | 0.34 | 0.32 | 0.41 | 4.48 |

TABLE 2

| Division | Comparative Example 1 | Comparative Example 2 | Example 1 | Example 2 | Example 3 | Example 4 | Example 5 | Example 6 | Example 7 |
|---|---|---|---|---|---|---|---|---|---|
| Whether acrylic dispersant is included | X | X | ◯ | ◯ | ◯ | ◯ | ◯ | ◯ | ◯ |
| Active material content (weight %) | 96.5 | 96.5 | 96.5 | 96.5 | 96.5 | 96.5 | 96.5 | 96.5 | 96.5 |
| Conductive material content (weight %) | 1.5 | 1.5 | 1.5 | 1.5 | 1.5 | 1.5 | 1.5 | 1.5 | 1.5 |
| Binder Content (weight %) | 2 | 2 | 2 | 2 | 2 | 2 | 2 | 2 | 2 |
| Solids content (weight %) | 73 | 73 | 73 | 73 | 73 | 73 | 73 | 73 | 73 |
| Electrode adhesion (N/18 mm) | 0.45 | 0.31 | 0.43 | 0.41 | 0.41 | 0.43 | 0.44 | 0.41 | 0.45 |
| Electrode Resistance (Ω · cm) | 27.8 | 11.2 | 10.8 | 9.8 | 9.4 | 9.1 | 9.6 | 9.7 | 9.9 |

TABLE 3

| | | Comparative Example 3 | | Example 8 | | Example 9 | |
|---|---|---|---|---|---|---|---|
| Conductive material content (weight %) (CNT predispersed solution) | Dispersant Type | 0.5 | H-NBR | 0.5 | Acrylic Dispersant | 0.5 | Acrylic Dispersant |
| | Dispersant Content (weight %) | | 0.1 | | 0.125 | | 0.125 |
| | Conductive material:Dispersant content ratio | | 100:20 | | 100:25 | | 100:25 |
| Additional acrylic dispersant content (weight %) | | | — | | — | | 1.5 |
| Whether acrylic dispersant is included | | | X | | ◯ (0.125%) | | ◯ (0.125% + 1.5%) |
| Active material content (weight %) | | | 97.9 | | 97.875 | | 96.375 |
| Binder Content (weight %) | | | 1.5 | | 1.5 | | 1.5 |
| Solids content (weight %) | | | 65 | | 65 | | 65 |

TABLE 3-continued

| | | Comparative Example 3 | Example 8 | Example 9 |
|---|---|---|---|---|
| Shear viscosity (Pa·s) | 0.1/s | 958.1 | 749 | 26.91 |
| | 1/s | 176.7 | 59.97 | 6.201 |
| | 4.64/s | 37.35 | 13.98 | 3.463 |
| | 100/s | 4.123 | 3.244 | 2.602 |
| Phase Angle (°) | Before shear ($PA_0$) | 17.2 | 28.0 | 51.8 |
| | After shear ($PA_1$) | 17.0 | 21.0 | 57.4 |
| | Phase angle change rate ($R_{PA}$) before and after shear | 0.012 | 0.25 | 0.108 |
| Electrode Adhesion (N/18 mm) | | 0.36 | 0.38 | 0.42 |
| Electrode Resistance (Ω · cm) | | 7.8 | 6.4 | 4.3 |

Referring to Tables 1 to 3, in the case of the cathode slurry compositions of Comparative Examples 1 to 3 not containing an acrylic dispersant, unlike Examples 1 to 9, it was found that the shear viscosity value exceeded 70 Pa·s at a shear rate of 1/s. In detail, referring to FIGS. 1A to 1C, in the case of the cathode slurry composition of Comparative Example 3 not containing an acrylic dispersant, although the solids content was the same as in Examples 8 and 9, it was found to have a slurry form with relatively significantly low fluidity, while in the case of Examples 8 and 9, especially Example 9, it was found to have a cathode slurry form with significantly improved fluidity even though it had the same solids content.

In addition, the cathodes prepared from the cathode slurry compositions of Comparative Examples 1 to 3 had relatively low electrode adhesiveness values or relatively high electrode resistance values, and it was found that electrode adhesion and/or resistance characteristics were inferior.

Meanwhile, all of the cathode slurry compositions of Examples 1 to 9 including the acrylic dispersant had a solids content of 65% by weight or more, and in Examples 1 to 7 as compared to Comparative Examples 1 and 2 and in Examples 8 and 9 as compared to Comparative Example 3, it was found to have relatively high electrode adhesive strength and low electrode resistance value, and both electrode adhesive strength and electrode resistance characteristics were found to be relatively excellent.

In addition, in the case of the cathode slurry composition of Example 9 including a conductive material dispersed solution to which an acrylic dispersant is applied as a dispersant and an additional acrylic dispersant, the phase angle values before and after shear were relatively high, and the phase angle change rate before and after shear were relatively low. Therefore, flowability, coating processability, and the like were significantly excellent, and the electrode adhesion and electrode resistance characteristics of the prepared cathode were also excellent. Therefore, as in Example 9, when a conductive material is added in the form of a dispersed solution to the cathode slurry containing an acrylic dispersant and when the conductive material dispersed solution includes an additional acrylic dispersant as a dispersant, it is determined that a cathode slurry composition having excellent flowability, coating processability, and the like and also having excellent electrode adhesion and resistance characteristics of the finally manufactured cathode for a secondary battery may be provided.

As set forth above, according to an embodiment, there is provided a conductive material dispersed solution in which dispersibility of a conductive material and the like may be effectively improved when the conductive material is added to a cathode slurry composition by pre-dispersing the conductive material to an excellent level, and high solids characteristics of the cathode slurry and the like may be secured by suppressing aggregation between active material particles in the cathode slurry.

According to another embodiment, a cathode slurry composition having excellent dispersibility, flowability, and the like and having a relatively high solids content and low shear viscosity may be provided by suppressing aggregation between particles of a cathode active material. According to the cathode slurry composition, a cathode for a secondary battery may be manufactured with excellent processability without limitations on electrode loading design, coating speed setting, and the like.

According to another embodiment, provided may be a cathode for a secondary battery in which occurrence of the mixture layer peeling phenomenon and the like during battery charging/discharging may be effectively suppressed by improving adhesion between the current collector and the mixture layer, and ion conduction characteristics, resistance characteristics and the like are excellent.

Only specific examples of implementations of certain embodiments are described. Variations, improvements and enhancements of the disclosed embodiments and other embodiments may be made based on the disclosure of this patent document.

What is claimed is:

1. A cathode for a secondary battery prepared from a cathode slurry composition comprising:
   a conductive material dispersed solution, a cathode active material, and a solvent,
   wherein the conductive material dispersed solution comprises:
   an acrylic dispersant containing an acrylic compound, a conductive material, and a dispersion medium,
   wherein a solids content of the conductive material dispersed solution is 3% to 50% by weight, and
   a shear viscosity value of the conductive material dispersed solution measured at 25° C. and a shear rate of 1/s is 70 Pa·s or less,
   wherein an electrode resistance value is less than 30.0 Ω cm.

2. The cathode for a secondary battery of claim 1, wherein the acrylic dispersant includes a polyacrylate-based compound.

3. The cathode for a secondary battery of claim 1, wherein a number average molecular weight ($M_n$) of the acrylic compound is 100,000 or less.

4. The cathode for a secondary battery of claim 1, wherein the acrylic dispersant is included in an amount of 5 to 40 parts by weight with respect to 100 parts by weight of the conductive material, based on the solids content of the conductive material dispersed solution.

5. The cathode for a secondary battery of claim 1, wherein the acrylic dispersant is included in an amount of 0.1 to 10% by weight based on the solids content of the conductive material dispersed solution.

6. The cathode for a secondary battery of claim 1, wherein the conductive material is included in an amount of 0.1 to 20% by weight based on the solids content of the conductive material dispersed solution.

7. The cathode for a secondary battery of claim 1, wherein an electrode adhesion value is greater than 0.30 N/18 mm.

\* \* \* \* \*